Patented Apr. 8, 1941

2,237,973

UNITED STATES PATENT OFFICE 2,237,973

PROCESS OF MAKING LIME ROSIN

Robert E. Price and Ismond E. Knapp, Picayune, Miss., assignors to Crosby Naval Stores, Incorporated, Picayune, Miss., a corporation of Mississippi No Drawing. Application February 29, 1940, Serial No. 321,563

12 Claims. (Cl. 260—105)

The present invention relates to a process of liming rosin and is more particularly concerned with an improved process of initiating and subsequently conducting and controlling the reaction between lime and rosin.

Untreated rosin is, in many instances, unsuitable for use in varnishes directly. Excess acid content has a definite influence on the "livering" of varnishes and the comparative softness and stickiness of untreated rosin manifests itself in a varnish product by its inability to retain its gloss.

It has been known for many years that the acidity of rosin may be reduced and its melting point increased by reacting it with lime. This liming operation is conducted commercially on both gum rosin and wood rosin and on pale grades as well as dark grades of each kind of rosin, depending on the color requirements of the varnish or other product in which the limed rosin is to be used. In referring here to liming operations it will be understood that such operations contemplate and encompass only those processes wherein the quantity of lime added is always less than the quantity stoichiometrically necessary for complete neutralization of the acidic components of the rosin.

One procedure commonly used at the present time is to melt the rosin, heat it to about 200° to 210° C. and then add the desired quantity of slaked lime. Ordinarily the quantity of slaked lime employed varies from 1% to 7% of the weight of the rosin. The more common practice is to add about 6% slaked lime. After the slaked lime has been added the temperature of the mass is then raised to about 285° C. to complete the reaction. These temperatures obviously are considerably above the range which can be reached with ordinary steam pressure, i. e., 100–150 pounds per square inch gauge. It is customary, therefore, to use a direct-fired kettle, or a jacketed kettle in which hot oil or other heat-transfer medium is circulated through a direct-fired heater and then through the jacket. These procedures are either dangerous or entail the use of costly apparatus. One object of the present invention, therefore, is to provide a process for liming rosin which can be conducted in steam heated equipment using steam at pressures ordinarily available in plant operation, i. e., 100–150 pounds guage.

When certain grades of rosin, particularly the medium and pale grades of wood rosin, are limed at a temperature in the range of say 140° to 160° C., the reaction is very slow to start, uncertain, and often incomplete, especially when only 1 to 2 percent of lime is used. Even with vigorous mechanical agitation the reaction usually does not start until from 2 to 3 percent of lime has been added and even then it may require one or two hours stirring. Once the reaction does start it takes place with considerable violence and cannot be controlled. The batch often foams over with consequent danger to the operator, as well as loss of material. Another and salient object of the invention, therefore, is to provide a rosin-liming process which can be initiated at comparatively low temperatures, controlled easily and in which the reaction proceeds smoothly, thus avoiding dangerous fluctuations in the reaction rate.

It has now been found, in accordance with the present invention, that the reaction between lime and rosin may be initiated and caused to proceed smoothly until practically all of the lime reacts, by the positive addition of a small amount of water, either to the rosin or to the lime before reaction or to a mixture of the two reacting ingredients. There are several methods by which the water may be introduced. One method is to add a small amount of water to the rosin before the addition of lime. Another method is to moisten the first portion of the lime with water to make a paste and then adding the paste to the rosin. A further alternative method is to blow a slow current of steam into the reaction vessel containing the molten rosin while the lime is being added. Still another method can be used and this forms the preferred embodiment of the invention, namely, to add a small portion of powdered slaked lime, say 0.5% of the weight of the rosin, to the molten rosin, which is being stirred at a temperature between 130° and 160° C., and then add a small amount of water, say not more than 0.2% of the weight of the rosin. This causes the reaction to start and it will proceed smoothly while the rest of the lime is added.

The successful operation of the process forming the subject matter of the present invention is not dependent upon nor limited to any specific proportion of water, and the 0.2% mentioned above is not critical. It should be stated and emphasized, however, that the water or steam is preferably added as a definite manipulative step in the process.

It has been found that less than 0.2% of added water is often sufficient although considerably more than this proportion has been used with satisfactory results. If as much as 1% or 2% is used, however, there may be excessive foaming and at temperatures below approximately 140°

C. the viscosity of the molten rosin is such that this foam does not break immediately. Too much water, therefore, may cause the batch to foam over unless there is an unusually large volume of head-room in the reaction vessel.

The concept of the present invention, and the attendant advantages thereof, is not limited to liming operations wherein the rosin is reacted in the molten state. As is well known, limed rosin is often dissolved in a suitable solvent such as mineral spirits or other petroleum hydrocarbon solvent. The proportions of lime to rosin and solvent are so chosen that the resulting solution will have a certain definite concentration, for example, 60% solids by weight. Such a solution is well known as gloss oil and is widely used in the paint and varnish industry.

It is also known to produce gloss oil by dissolving rosin in the desired solvent and effecting the liming reaction in solution. The solution is heated, usually with steam coils, in a vessel preferably fitted with a vapor outlet to a condenser. Obviously the maximum temperature at which the liming reaction can take place is determined by the boiling point of the solution. Ordinarily the operating temperature is within the range 130°–160° C. Under these conditions the medium and pale grades of wood rosin, as ordinarily produced, do not react with lime, or, if they do react, the reaction is slow, uncertain, and incomplete.

As stated, the present process is applicable to liming operations wherein the rosin is in solution and wherein gloss oil is produced directly. In other words, it has been found that the addition of a small amount of water will cause the reaction between lime and rosin in solution to start and proceed smoothly practically to completion. As described above the water may be added before or with the first portion of lime, or it may be added in the form of a slow current of steam throughout the reaction, or water may be added after the first portion of lime. The proportions are preferably similar to those described above for the liming of molten rosin.

Just how the added water or water vapor functions to initiate and control this otherwise sluggish reaction between rosin and lime is not clearly understood. One theory is here offered although it is to be distinctly understood that the invention is in no way limited thereto. The theory is submitted merely as a possible explanation of the phenomena which has been actually observed and regardless of whether this explanation is correct or not, the addition of water or water vapor to the reactants does and will cause the reaction to start and proceed smoothly practically to completion.

The reaction is apparently a heterogeneous one in which solid particles of lime are distributed throughout a liquid mass of either molten rosin or rosin in solution. It can be imagined that when water is added there is, momentarily at least, a film of water on the surface of the particles of lime. This film of water will, of course, hold a small amount of $Ca(OH)_2$ in solution, and it may be that it is this dissolved $Ca(OH)_2$ which reacts with the molten rosin, the latter always being present in large excess. As it reacts more water is formed so that it can be imagined that, once the reaction starts, each particle of lime is constantly surrounded by a film of water. As the reaction continues the particle constantly grows smaller until it has entirely disappeared. The calcium abietate is removed from the zone of the reaction as fast as it is formed for it is readily soluble in the excess rosin. At temperatures of 130°–160° C. the water formed in the reaction will, of course, vaporize and escape as steam, but this will require an appreciable interval of time. It can, therefore, be assumed that once the reaction has started there will continue to be at least a small amount of moisture present as long as there is any unreacted lime.

The following specific examples will serve to illustrate the invention:

*Example 1*

100 grams of N grade wood rosin having an acid number of 166 was placed in a 250 ml. beaker set in an oil bath which was maintained at 155° C. After the rosin had melted and had reached a temperature of 135° C. a motor driven agitator was started and 0.5 gram of powdered slaked lime was added. There was no indication of any reaction. Then three drops of distilled water was added and the reaction started at once. Further small additions of lime were made during 15 minutes, maintaining the temperature at about 140°–145° C. and continuing the agitation. After the last portion of lime had been added an additional two drops of water was added and the stirring was continued for 45 minutes. The total weight of lime added was 5.0 grams or 5% of the weight of the rosin. The acid number of the limed rosin so produced was 91. This drop in the acid number indicates that at least 98 percent of the lime had reacted.

*Example 2*

The procedure was the same as in Example 1, except that WG gum rosin was used. The reaction with 5 percent lime under the above conditions reduced the acid number from 166.5 to 96, indicating that at least 93% of the lime had reacted.

*Example 3*

The procedure was the same as in Example 1, except that K wood rosin was limed with 4 percent lime. The acid number was reduced from 164 to 107.8, indicating that about 93% of the lime has reacted.

*Example 4*

The procedure was the same as in Example 1, except that I grade wood rosin was used. On adding 5¼ percent lime the acid number was reduced from 163 to 89, indicating that over 93 percent of the lime had reacted.

*Example 5*

The procedure was the same as in Example 1, except that 0.2 ml. of distilled water was added to molten rosin at 135° C. before any lime was added. The first portion of the lime reacted immediately, and the reaction continued smoothly while the balance of the lime was added. The acid number of the finished product was 92.

*Example 6*

100 grams of N grade wood rosin was melted and heated to 135° C. as in Example 1. Then a paste consisting of 0.5 gram of lime and 0.5 ml. of water was added and the reaction started immediately. An additional 2.5 grams of powdered lime was then added in small portions over a period of 10 minutes, making the total lime equivalent to 3 percent of the weight of the rosin. After stirring for one hour at a temperature of 140°–147° C. the batch showed an acid number 121, indicating that approximately 95 percent of the lime had reacted.

*Example 7*

3,500 pounds of M grade wood rosin was loaded into a steam-jacketed kettle equipped with a motor driven agitator. The rosin was melted and heated to 150° C. with stirring. Fifteen pounds of slaked lime was added but there was no indication of any reaction. Three quarts of water (equivalent to about 0.17% of the weight of the rosin) was then added and the reaction started at once and proceeded smoothly while an additional 41 pounds of lime was added during 30 minutes, making a total of 56 pounds of lime or 1.6 percent of the weight of the rosin. After stirring for two hours at a maximum temperature of 155° C. the batch was dropped into drums. The acid number was 142 as compared with 165 on the original rosin, indicating that about 95 percent of the lime had reacted.

*Example 8*

3,500 pounds of N grade wood rosin was limed with 210 pounds of lime in the same manner as described under Example 7. As before there was no reaction with the first portion of lime but the addition of three quarts of water initiated the reaction and it proceeded smoothly until the full six percent of lime had been added in small portions during 45 minutes. Stirring was continued for an additional two hours at a maximum temperature of 155° C. It was then found that the acid number had been reduced from 166 to 78, indicating that approximately 98 percent of the lime had reacted.

*Example 9*

100 grams of WG wood rosin was placed in a flask which set in an oil bath maintained at 155° C. After the rosin had melted and had reached a temperature of 135° C., a motor driven agitator was started and a slow current of steam was bubbled through the molten rosin. 5.0 grams of powdered lime was then added in small portions over a period of 15 minutes, while the current of steam was continued. The lime reacted readily and smoothly. After stirring for one hour at 140°–145° C. an analysis showed that the acid number had dropped from 166 to 91.8, indicating that over 98% of the lime had reacted.

*Example 10*

100 grams of WG grade wood rosin was dissolved in 67 grams of mineral spirits in a flask set in an oil bath. The solution was heated to 135° C. and stirred with a motor driven agitator. A slow current of steam was bubbled through the solution and 5.0 grams of powdered lime was added in small portions during about 20 minutes. It reacted readily and smoothly as fast as it was added. After stirring for 45 minutes at 130°–140° C. a small volume of mineral spirits was added to make up what had been lost by evaporation, and the gloss oil was analyzed. The solids present showed an acid number of 91, indicating that approximately 98 percent of the lime had reacted.

*Example 11*

The procedure was the same as that in Example 10, except that no steam was used. One gram of lime was added and there was no evidence of any reaction. 0.2 ml. of distilled water was then added and the addition of lime was continued. It reacted readily and smoothly, and the solids in the finished gloss oil showed an acid number of 90.8.

*Example 12*

The procedure was the same as in Example 11, except that N grade of wood rosin was used. The acid number of the solids in the finished gloss oil was 90.8.

While the invention has been described in connection with medium or pale grades of rosin, where the liming operation is normally very sluggish, it is to be distinctly understood that the processes herein disclosed are equally adaptable to the liming of the darker grades of rosin, such as FF wood rosin. The presence of a small amount of water or water vapor is definitely beneficial in the liming of these darker grades.

It is to be further understood that the invention is in no way limited to the temperatures, concentrations of proportions recited in the foregoing examples since these examples are illustrative and not limitative.

What is claimed is:

1. In a process for liming rosin with the aid of heat, that improvement which comprises reacting slaked lime with rosin in the presence of an initiating agent which consists of a small amount of added water.

2. In a process for liming rosin with the aid of heat, that improvement which comprises reacting slaked lime with molten rosin in the presence of an initiating agent which consists of a small amount of added water.

3. In a process for liming rosin with the aid of heat, that improvement which comprises reacting slaked lime with rosin in solution in the presence of an initiating agent which consists of a small amount of added water.

4. In a process for initiating and controlling a rosin liming reaction during subjection to heat, that improvement which comprises melting the rosin, adding a reaction initiating agent which consists of a small amount of water to the molten rosin and then adding slaked lime.

5. In a process for initiating and controlling a rosin liming reaction during subjection to heat, that improvement which comprises melting the rosin, adding a reaction initiating agent which consists of a small amount of water to a portion of the desired amount of slaked lime to form a lime paste, adding the lime paste to the molten rosin and then adding the remainder of the slaked lime.

6. In a process for initiating and controlling a rosin liming reaction during subjection to heat, that improvement which comprises melting the rosin, adding a small portion of the desired amount of slaked lime to the molten rosin, adding a reaction initiating agent which consists of a small amount of water and then adding the remainder of the slaked lime.

7. A process for initiating and controlling a rosin liming reaction which comprises melting the rosin, adding with the aid of agitation approximately 0.5% slaked lime to the molten rosin, adding a small amount of water, not in excess of 0.2%, and then adding the remainder of the slaked lime.

8. In a process for initiating and controlling a rosin liming reaction during subjection to heat, that improvement which comprises dissolving the rosin in a suitable solvent, adding a reaction initiating agent which consists of a small amount of water to the rosin solution and then adding slaked lime.

9. In a process for initiating and controlling a rosin liming reaction during subjection to heat, that improvement which comprises dissolving the rosin in a suitable solvent, adding a reaction initiating agent which consists of a small amount of water to a portion of the desired amount of slaked lime to form a lime paste, adding the lime paste to the rosin solution and then adding the remainder of the slaked lime.

10. In a process for initiating and controlling a rosin liming reaction during subjection to heat, that improvement which comprises dissolving the rosin in a suitable solvent, adding a small portion of the desired amount of slaked lime to the rosin solution, adding a reaction initiating agent which consists of a small amount of water and then adding the remainder of the slaked lime.

11. A process for initiating and controlling a rosin liming reaction which comprises melting the rosin and bubbling a slow current of steam through the molten rosin while adding slaked lime.

12. A process for initiating and controlling a rosin liming reaction which comprises dissolving the rosin in a suitable solvent and bubbling a slow current of steam through the rosin solution while adding slaked lime.

ROBERT E. PRICE.
ISMOND E. KNAPP.